US009545078B1

(12) United States Patent
Yadin et al.

(10) Patent No.: US 9,545,078 B1
(45) Date of Patent: Jan. 17, 2017

(54) ELECTRO-HYDRAULICAL ACTUATOR FOR A ROBOT ARM

(75) Inventors: Gideon Yadin, Noordwijk (NL); Alon Tavori, Haifa (IL)

(73) Assignee: Lely Patent N.V., Maassluis (NL)

(*) Notice: Subject to any disclaimer, the term of this patent is extended or adjusted under 35 U.S.C. 154(b) by 221 days.

(21) Appl. No.: 13/491,042

(22) Filed: Jun. 7, 2012

(51) Int. Cl.
A01J 5/00 (2006.01)
A01J 5/017 (2006.01)

(52) U.S. Cl.
CPC ........................... A01J 5/017 (2013.01)

(58) Field of Classification Search
CPC .......... A01J 5/0175; A01J 5/007; A01J 5/017; A01J 5/04; A01J 7/04; A01J 7/00; A01J 7/02; A01J 5/00; A01K 1/12; A01K 1/126; A01K 5/02
USPC .............. 119/14.1, 14.01, 14.02, 14.03, 14.04,119/14.08, 14.18, 14.14; 60/459; 91/422

See application file for complete search history.

(56) References Cited

U.S. PATENT DOCUMENTS

| | | | | |
|---|---|---|---|---|
| 640,165 A | * | 12/1899 | O'Connor | 403/256 |
| 3,472,125 A | * | 10/1969 | Noble | F15B 11/08 416/157 R |
| 3,941,534 A | * | 3/1976 | Hunkar | B29C 45/77 264/40.7 |
| 4,665,558 A | * | 5/1987 | Burke | 92/2 |
| 5,042,428 A | * | 8/1991 | Van der Lely et al. | 119/14.08 |
| 5,415,057 A | | 5/1995 | Nihei et al. | |
| 5,479,876 A | * | 1/1996 | Street et al. | 119/14.08 |
| 5,697,324 A | * | 12/1997 | van der Lely | 119/14.08 |
| 5,784,994 A | * | 7/1998 | van der Lely | 119/14.08 |
| 5,842,436 A | * | 12/1998 | van der Lely | 119/14.08 |
| 5,967,081 A | * | 10/1999 | Street et al. | 119/14.08 |
| 6,081,981 A | * | 7/2000 | Demarest et al. | 29/407.08 |
| 6,116,188 A | * | 9/2000 | van der Lely | 119/14.02 |
| 6,213,051 B1 | * | 4/2001 | Fransen | 119/14.08 |
| 6,443,094 B1 | * | 9/2002 | DeWaard | 119/14.18 |
| 6,463,877 B1 | * | 10/2002 | van der Lely | 119/14.08 |
| 7,090,940 B2 | * | 8/2006 | Schrooten | F28D 20/025 165/110 |
| 8,714,110 B2 | * | 5/2014 | Savoia et al. | 119/452 |
| 2004/0065264 A1 | * | 4/2004 | Ealy et al. | 119/14.08 |
| 2004/0168645 A1 | * | 9/2004 | Deelstra | 119/14.02 |

(Continued)

FOREIGN PATENT DOCUMENTS

EP 0 551 960 A1 7/1993
EP 0 673 596 A1 9/1995

OTHER PUBLICATIONS

Liyanage, et al.; "High Speed Electro-Hydralic Actuator for a SCARA Type Robotic Arm"; The 2010 IEEE/RJS International Conference on Intelligent Robots and Systems; Oct. 13-22, 2010; pp. 470-473.

*Primary Examiner* — Trinh Nguyen
(74) *Attorney, Agent, or Firm* — Oblon, McClelland, Maier & Neustadt, L.L.P.

(57) ABSTRACT

A robotic apparatus for treatment of at least one body part of an animal including a device that treats the body part, a device that detects the body part, a robot arm including a plurality of robot arm parts and a plurality of hydraulic actuators for mutually displacing and positioning of the robot arm parts, at least two of the plurality of hydraulic actuators being independently controlled electro-hydraulic actuators, and a controller configured to control the hydraulic actuators to assist the robot arm in bringing the robot arm part having a treatment device to the body part in response to feedback from the detection device.

13 Claims, 9 Drawing Sheets

(56) References Cited

U.S. PATENT DOCUMENTS

| | | | |
|---|---|---|---|
| 2010/0107864 A1* | 5/2010 | Bushner | 91/422 |
| 2011/0054669 A1* | 3/2011 | Savoia et al. | 700/218 |
| 2012/0012060 A1* | 1/2012 | Eriksson | A01J 7/025 |
| | | | 119/14.18 |
| 2012/0048208 A1* | 3/2012 | Hofman et al. | 119/651 |
| 2012/0186379 A1* | 7/2012 | Miyamoto | B25J 19/0012 |
| | | | 74/490.01 |
| 2013/0074775 A1* | 3/2013 | Andersson et al. | 119/14.04 |

* cited by examiner

ELECTRO-HYDRAULICAL ACTUATOR FOR A ROBOT ARM

BACKGROUND

Field of the Disclosure

The present invention is generally related to actuators for a robot arm and more particularly related to electro-hydraulic actuators for moving a robot arm of a milking robot or a gate used in a milking parlour.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A robot arm can be moved in three-dimensions. In such known arrangements, the robot arm can be actuated by a plurality of cylinders of the hydraulic (driven by a central pump), pneumatic, or electromechanical type. As described below, the inventors have recognized that with conventional hydraulic systems, in the milking parlour environment, uncleanliness due to hydraulical oil leakage and energy consumption are issues which heretofore have not been satisfactorily addressed.

SUMMARY

The presently described subject matter relates in one embodiment to a robotic implement for automatic teat treatment of at least one teat of a milking animal, including a teat treatment device for the treatment of the teat, a teat detection device for detecting the teat, a robot arm having a plurality of robot arm parts and a plurality of hydraulic actuators for mutually displacing and positioning of the robot arm parts, and a control system for controlling the robotic implement for having the robot arm bring the teat treatment device to the teat.

The risk of leakage of hydraulical oil by the actuators is reduced when using electro-hydraulical actuators (EHAs) to move the various parts of a robot arm because there is no central hydraulical oil "vat" such as used in conventional hydraulical systems with piping or hosing to the various actuators, pump accumulator, and so on.

Further, since an EHA system typically works with lower hydraulical pressure (not only peak pressure, but also during actuation), the risk of leakage is further reduced.

With the use of a "through-rod" piston arrangement (i.e., a substantially symmetrical double piston rod arrangement), an EHA system has no net oil volume change during movement of the piston in the cylinder. Consequently, the accumulator (typically there to accommodate such changes in oil volume, but necessary to accommodate volume changes due to temperature differences or micro-leaks) can be relatively small. This small amount of total oil further reduces risks for leaks and environmental damage.

The inventors discovered that energy consumption is reduced when using a plurality of EHAs in a distributed configuration as each EHA only requires power when in use, and even then only requires a hydraulic pressure sufficient to move the corresponding part of the robot arm. That is, compared to the operating pressure of a conventional hydraulical system using a centralized pump which always operates at a maximum pressure (or off), the distributed EHAs operate at zero pressure unless they are being actuated and at that time only require a hydraulic pressure sufficient to move the corresponding part of the robot arm. The present invention can further employ load balancing to the robot arm by using load balancing means such as mounting springs wherein the springs carry most of the weight of the arm. When using such an arrangement, only a small force generated by the EHAs is needed to move the arm part. Thus, smaller EHAs may be used, further reducing oil pressure and volume, and thus further reducing the risk of oil spills, and reducing energy consumption.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
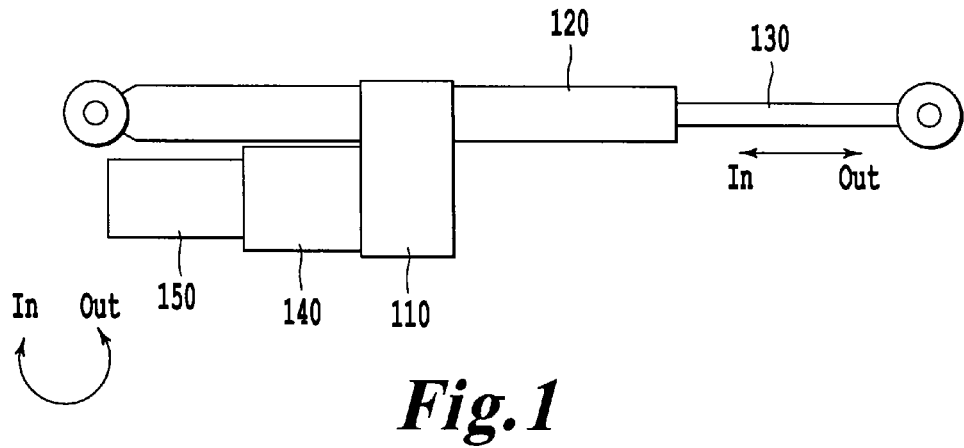
FIG. 1 illustrates diagrammatically an electro-hydraulic actuator according to an embodiment of the present invention.

Referring now to the drawings, wherein like reference numerals designate identical or corresponding parts throughout the several views.

The present invention employs a plurality of EHAs. Each EHA can be, in principle, a solid block, having a seal where the piston rod exits the cylinder, and an electrical connection to a pump. The solid block has internally machined connections for the hydraulical oil, but no piping, hoses, or the like to a centralized pump. Because there is no centralized pump, a high constant pressure in the system is not required to avoid the actuators from becoming subject to high abrasion conditions over the course of time. A constant high pressure in the system results in wasted energy, but also has as a disadvantage that it is not suitable in some regards for use with live animals in a milking application. The milking animal may kick the robot arm, get trapped by the robot arm, or the like. In such cases, there is a very high pressure on the hydraulic system because the robot arm will not move back. Hence, either the animal gets hurt, or the hydraulic system is damaged. Furthermore, there is much less risk of leakage, and even if there would be a leak, the risk of spilling oil on the animal or oil coming into contact with milk is reduced because of the lower oil pressure.

As illustrated in FIG. 1A, each EHA 101 includes a main block 110, a hydraulic cylinder 120, a piston rod 130, a pump 140, and an electric motor 150. The hydraulic cylinder 120 can be directly driven by the pump 140 which is operated by the electric motor 150. The rod 130 may be connected to any part to be moved, such as a robot arm part. The rod 130 may be a single-sided rod exiting the cylinder 120 only to the right. Alternatively, the rod 130 may extend through all of the cylinder 120, exiting the same both to the right and to the left (i.e., a through rod).

Figure 2A:
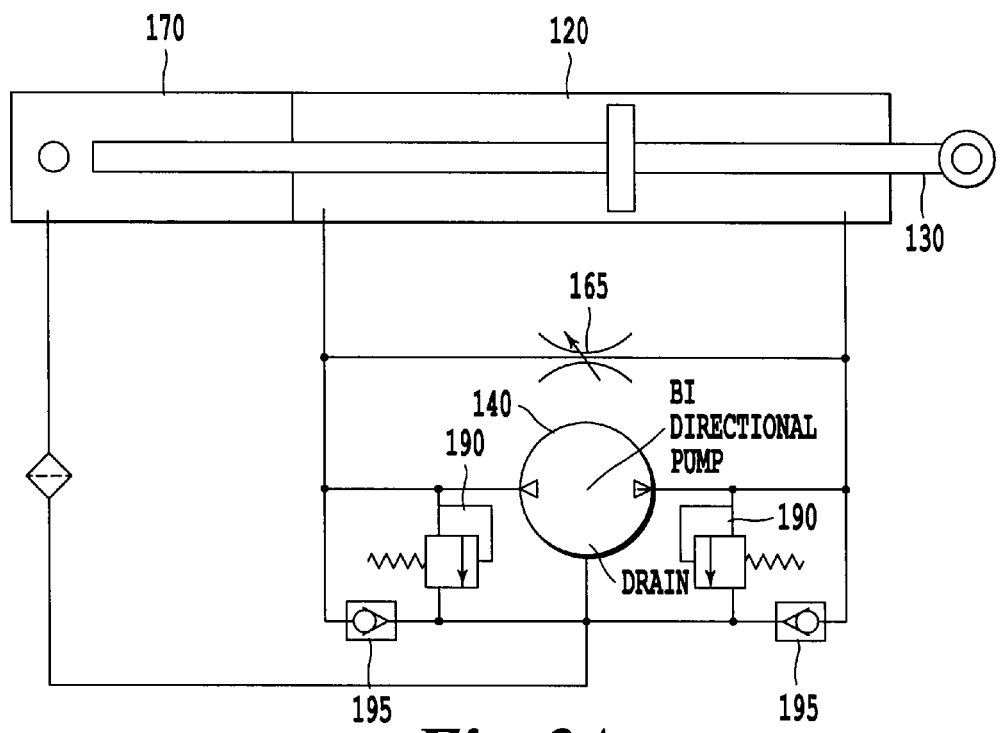
FIG. 2A illustrates a hydraulic circuit of the electro-hydraulic actuator according to an embodiment of the present invention.

FIG. 2A illustrates a hydraulic circuit according to an embodiment of the invention including the cylinder 120, the cylinder rod 130, a bi-directional pump 140, a throttle valve 165, and a sponge 170. The pump 140, motor (not illustrated), throttle valve 165, and hydraulic cylinder 120 can according to an embodiment of the invention be built as a single unit. The bi-directional pump 140 includes a drain. However, in normal operation, the drain is not used and substantially all of the hydraulic fluid is found in the sponge 170 or inside the cylinder 120. Pressure relief safety valves 190 and check valves 195 are provided on both sides of the bi-directional pump 140. The safety valves can be set at 80 bar for example.

The pump 140a pumps the hydraulic fluid directly into the cylinder 120. That is, according to this embodiment, no regulator valve is provided between the pump 140a and the cylinder 120. As a consequence of this configuration, there is no control delay due to an intervening valve when changing the pump direction. Further, because a drain and sponge are utilized, oil in the circuit can be accumulated in response to an impact on the robot arm due to an animal kick or the like which triggers one of the pressure relief safety valves 190 (depending on the direction the pump is pumping at the time of impact).

Figure 2B:
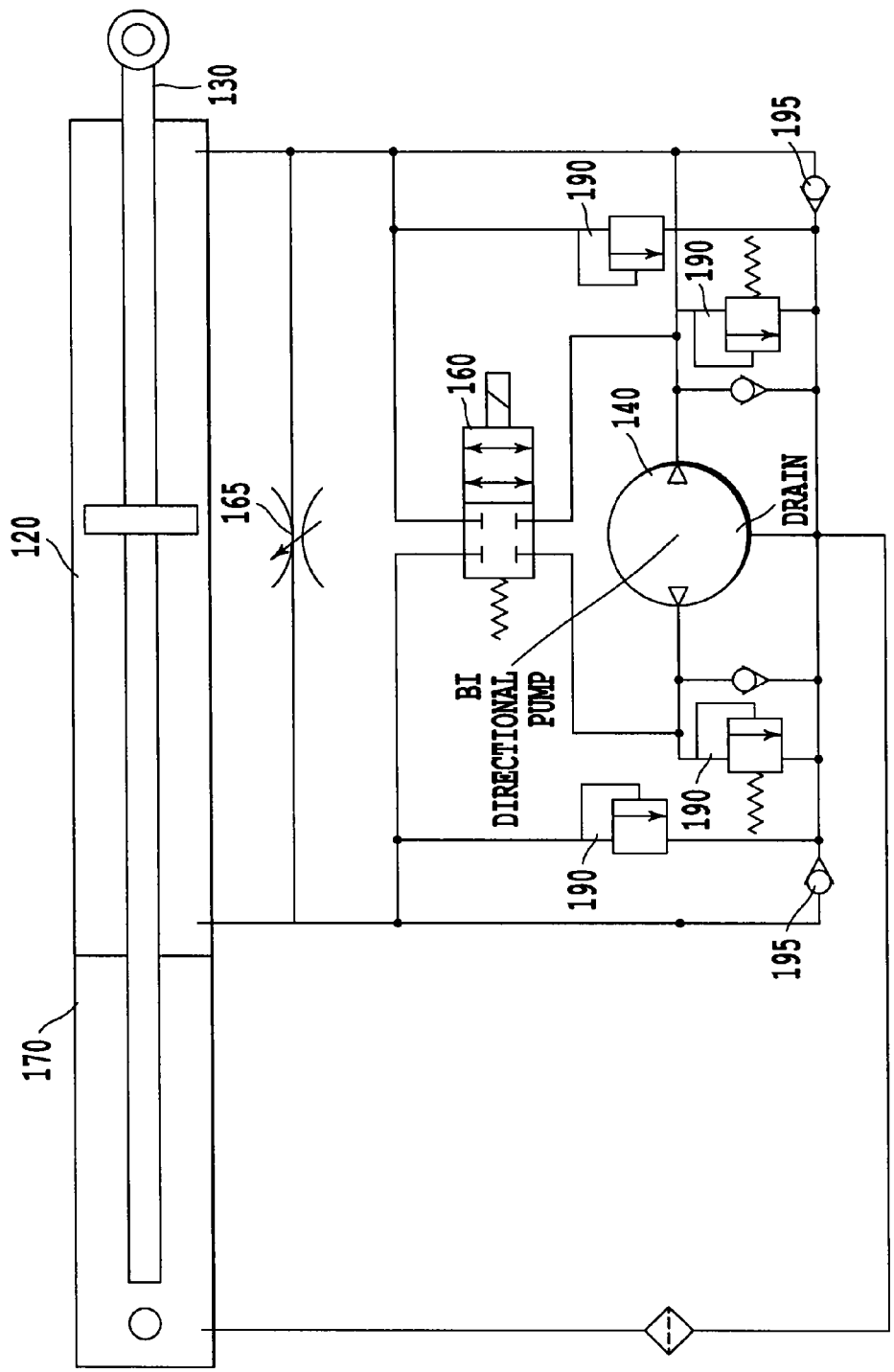
FIG. 2B illustrates a hydraulic circuit of the electro-hydraulic actuator according to a second embodiment of the present invention.

FIG. 2B illustrates a hydraulic circuit according to another embodiment of the invention including the cylinder 120, the cylinder rod 130, a pump 140, an electric motor 150, a regulator valve 160, an accumulator 170, a filter 180, and a relief (safety) valve 190. Same as the hydraulic circuit illustrated in FIG. 2A, the pump, motor, safety valve, and hydraulic cylinder can be built as a single unit. Further, the cylinder 120 can use either a single piston rod or a double ended (through) piston rod.

Figure 3:
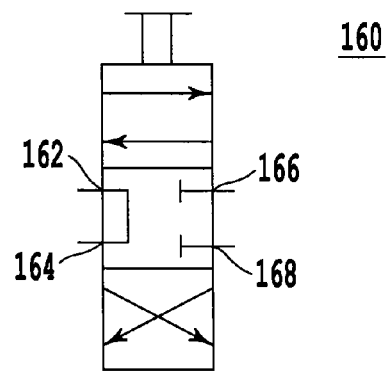
FIG. 3 illustrates diagrammatically a relief valve 4×2 valve for use in the electro-hydraulic actuator illustrated in FIG. 2.

In this embodiment, the hydraulic circuit includes a regulator valve 160. The regulator valve 160 (FIG. 3) is a flow regulator and hydraulic 4/3 valve. That is, the valve 160 is a directional control valve with four ways (see the arrows), four ports 162, 164, 166, and 168, and three positions or states. The valve can be moved up and down, allowing the three different positions. In its topmost position, there is a direct connection between ports 162 and 166 and between 164 and 168, so there is a clockwise flow from the upper left to the upper right, and back from the lower right to the lower left. In the middle position (as shown in FIG. 3) there is a direct connection between ports 162 and 164, with ports 166 and 168 closed off. In this state, there is only a circuit that shunts the oil back, not leading it through the cylinder. In its lowermost position, there is a connection between ports 162 and 168, and between ports 164 and 166, and there is a counterclockwise oil flow, i.e. a reversed movement of the rod.

Because in FIG. 2B the regulator valve 160 is used to change the direction of the rod of the cylinder 120, a control delay does exist due to the intervening valve used to change the pump direction. In lieu of using bi-directional pump with a drain, a single direction pump without a drain can be utilized due to the incorporation of the regulator valve 160.

In FIGS. 2A and 2B, the accumulator 170 is an integrated sponge-type spring-buffer. More typically, accumulators use a membrane. However, with a sponge type accumulator, the sponge is made of a multitude of closed cells which work as a spring. Consequently, there is a reduced exposure of the hydraulical oil to oxygen when one of the cells of the sponge leaks. Air or gas is trapped within the cells. Further, when an EHA is replaced, the complete local hydraulical circuit is exchanged, and no there is no need for shutting down the complete system and draining oil, as in conventional systems. Further, the lifecycle of the hydraulical oil is increased due to a reduced exposure of the hydraulical oil to the oxygen. Other alternative accumulators such as a piston type or a bladder type accumulator can be employed. Both the piston and bladder type accumulators use a gas chamber preloaded by gas (mostly nitrogen) through a vented port. The chamber should be sealed so the gas will not leak or dissolve in the oil.

Figure 2C:
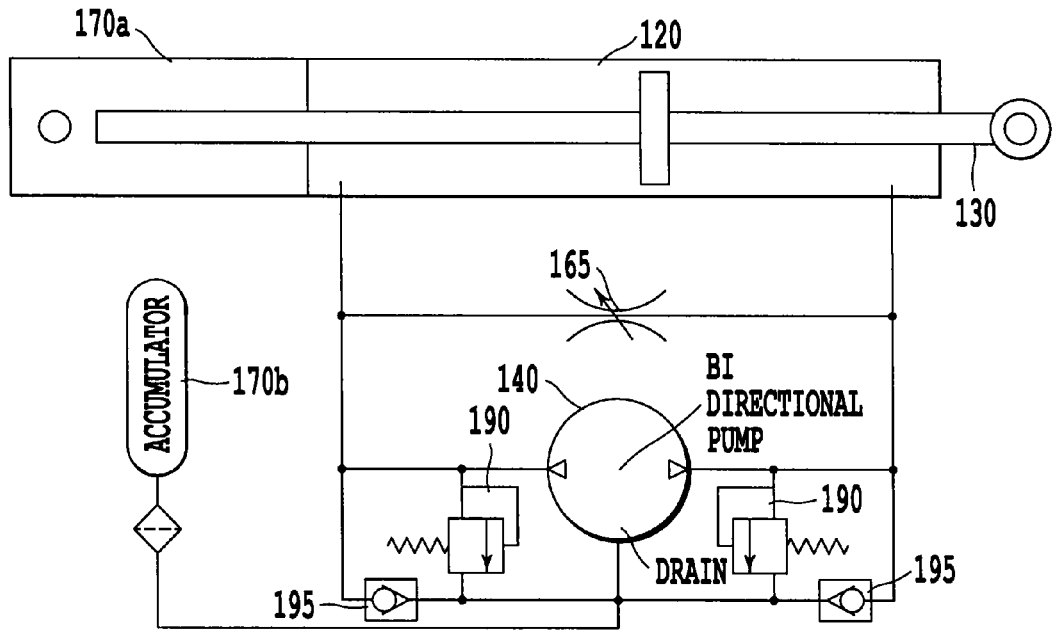
FIG. 2C illustrates a hydraulic circuit of the electro-hydraulic actuator according to a third embodiment of the present invention.

In FIG. 2C, a high density (volume) sponge is used as the accumulator

Because of the distributed configuration of the system wherein each EHA 101 has a relief valve or valves 190, only the corresponding component of the robot arm impacted by a kick or resistance (i.e., an overload) in the milking parlour will respond via pressure release by the relief valve and the relief response will be quick. Further, only those EHAs wherein the relief valve was actuated during an overload requires a reset. This is in contrast to conventional hydraulic systems used to move robot arms in milking environments. In those systems, a centralized relief valve is used for all of the hydraulical cylinders. The centralized relief valve often experiences a delayed response, for example in cold weather, due to the length of the piping or hosing needed to connect the valve to each of the hydraulical cylinders.

The pressure relief for each EHA 101 can be independently set. As each component of the robot arm requires different relief pressures, proportional pressure reliefs are set as necessary. The preset is done by the spring force that operates against the pressure until the pressure extends above the spring force, and then the valve is open to flow from in to out.

According to an embodiment of the invention (FIG. 4), the hydraulical cylinder 120 includes a cylinder with a cylinder housing or barrel 122. A piston 124 is movable in the cylinder housing 122, is connected to the piston rod 130, and divides the cylinder housing in a first cylinder chamber 128a and a second cylinder chamber 128b. The cylinder housing has a rigid and unitary hydraulic connection between a first fluid opening and the first cylinder chamber 128a as well as a rigid and unitary fluid connection between the second fluid opening and the second cylinder chamber 128b. Such a configuration provides a substantially hose-free system, with the possibility for a high degree of integration. One of the highest degrees of this integration is obtained when the EHA is a solid block with only an electrical connection for the electric motor, or drive for the pump.

Figure 4:
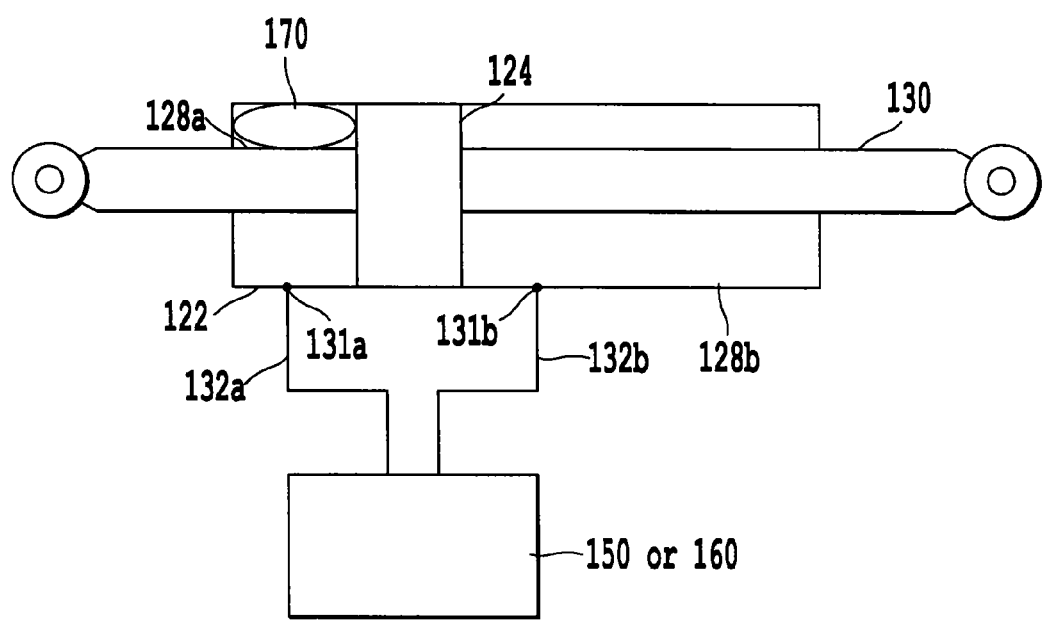
FIG. 4 illustrates diagrammatically a hydraulical piston cylinder for use in an electro-hydraulic actuator according to an embodiment of the present invention.

Typically, a hydraulic cylinder has a rod only on one side. Consequently, if the piston moves, the rod-less side displaces (cylinder bore×displacement) of oil, while the "rodded" side displaces ((cylinder bore−rod area)×displacement) of oil. However, according to an alternative embodiment as shown in FIG. 4, a so-called through-rod cylinder can be used. Here, the rod 126 extends through the cylinder housing 122, and exits same on both sides. With a through rod cylinder, the set-up is symmetrical, and there is no difference (i.e., no difference in the total volume of the chamber) regardless of the position of the piston. In such cases, there is no net volume change for the oil when displacing the piston, as a volume change in the first chamber 128a is exactly cancelled by an equal and opposite volume change in the second chamber 128b. In such a case, there will only be (small) volume changes due to a difference in expansion between cylinder housing and the hydraulical oil therein, due to varying temperatures, or possibly due to some minor oil leakage. Such small volume changes are easily accommodated by an internal accumulator 170, typically a closed-cell sponge type accumulator. Alternatively, the accumulator 170 may be provided external to the chambers, in a specific reservoir that is communicatively connected to the cylinder chambers, thus allowing the rod 126 to take a full shift. The sponge should be positioned in the drain or accumulator (the drain and accumulator can be maintained at different or the same pressure potential). If the sponge is located in the piston chamber it will be exposed to high pressure and in that environment cells will explode.

According to an embodiment of the invention, a 4×2 valve can be used to lock the piston in place, thus effectively neutralizing the displacement of hydraulical fluid. Accordingly, if a loss of electric current occurs, the system is instantly blocked and holds its position. In contrast, with a typical hydraulic solution such as a counterbalance valve, a piloted operation of the valves is required. In those cases, the control of the robot arm will not be uniform, nor as gentle as the above described architecture since the pump drives the oil in both directions straight to the piston chambers. If the pump changes from clockwise to counter-clockwise, it will appear immediately in the piston and in its moves.

Figure 5:
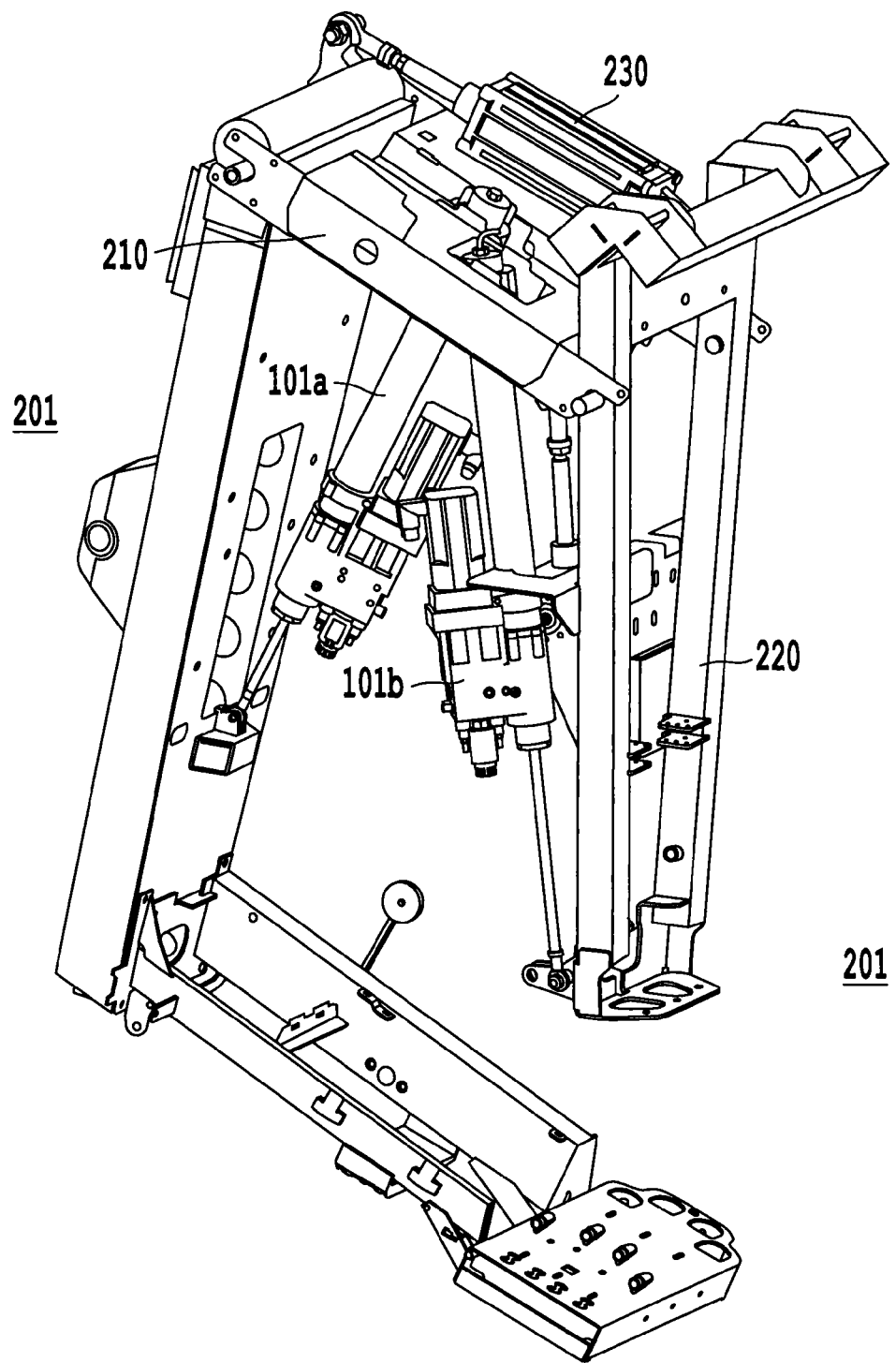
FIG. 5 illustrates diagrammatically a robot arm wherein ach moveable component of the robot arm has a corresponding electro-hydraulic actuator.

FIG. 5 illustrates a robot arm 201 having two moveable components or parts 210 and 220. Each moveable component has a corresponding EHA (101a and 101b, in this case). In addition, each component 210 and 220 includes a balancing system 230. According to an embodiment of the invention, the balancing systems 230 uses a mounted spring such that the spring carries most of the weight of the arm components. When using such an arrangement, only a small force generated by the EHA is needed to move the arm. Alternative means for load balancing the system include an air based systems. In this case, the system is preloaded with pneumatic pistons that generate force that assist the arm such that it travels in more of a "floating" state. Thus, the hydraulic pistons needs less energy/force to actuate the movements.

According to an embodiment of the present invention, the electric motor 150 is a direct electrical drive. This makes it possible to provide power on demand (i.e., only the power that is required to move the respective actuators is actually supplied). For example, if the EHA does not have to act against any substantial resistance, only a minimum power is required to move it. Whereas, if the resistance increases, the power required and delivered to the EHA also increases. Consequently, the energy consumption is quite minimal.

Figure 7:
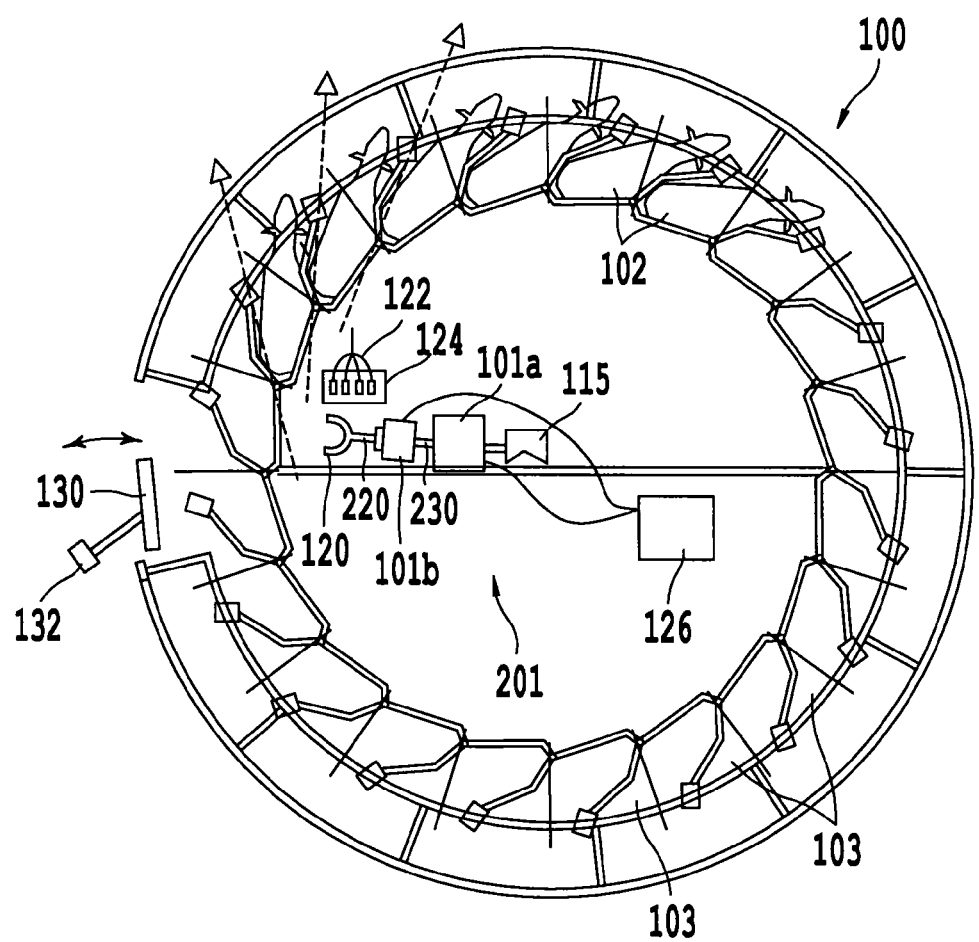
FIG. 7 illustrates diagrammatically a rotatable milking platform having a plurality of milking stands for milking dairy animals using a robot arm.

FIG. 7 illustrates a rotatable milking platform 100 having a plurality of milking stands 103 for milking dairy animals 102 using robot arm 201. Furthermore, there is provided a gate 130 that is movable by means of a robot arm 132, for letting dairy animals enter or leave the platform.

The robot arm 201 is connected to a frame 115, and comprises the first EHA 101a, a first robot arm part 230, a second EHA 101b, and a second robot arm part 220 with a gripper 120 for gripping milking equipment 122 from a storage 122. The first and second EHAs are operatively connected to a control unit 126 for controlling their movement. The first EHA 101a controls the position of the first arm part 230, and everything connected downstream thereto as seen from the frame, with respect to the frame 115, while the second EHA 116 controls the position of the second arm part 220, and everything connected downstream as seen from the frame, with respect to the first arm part. More robot arm parts and EHAs may be provided as desired. Control thereof, as of the gripper 120, may be by control unit 126 or a separate unit. As can be seen, in use of the platform and robot arm, the robot arm will contact the milking equipment 122, and will come in close proximity to dairy animals 102 when connecting the dairy equipment 122 to teats of the animals 102. To prevent contamination of milk, milking equipment or dairy animals, oil leakage form in particular the EHAs is to be avoided to a very high degree, and this is achieved with the system according to the invention.

Figure 8:
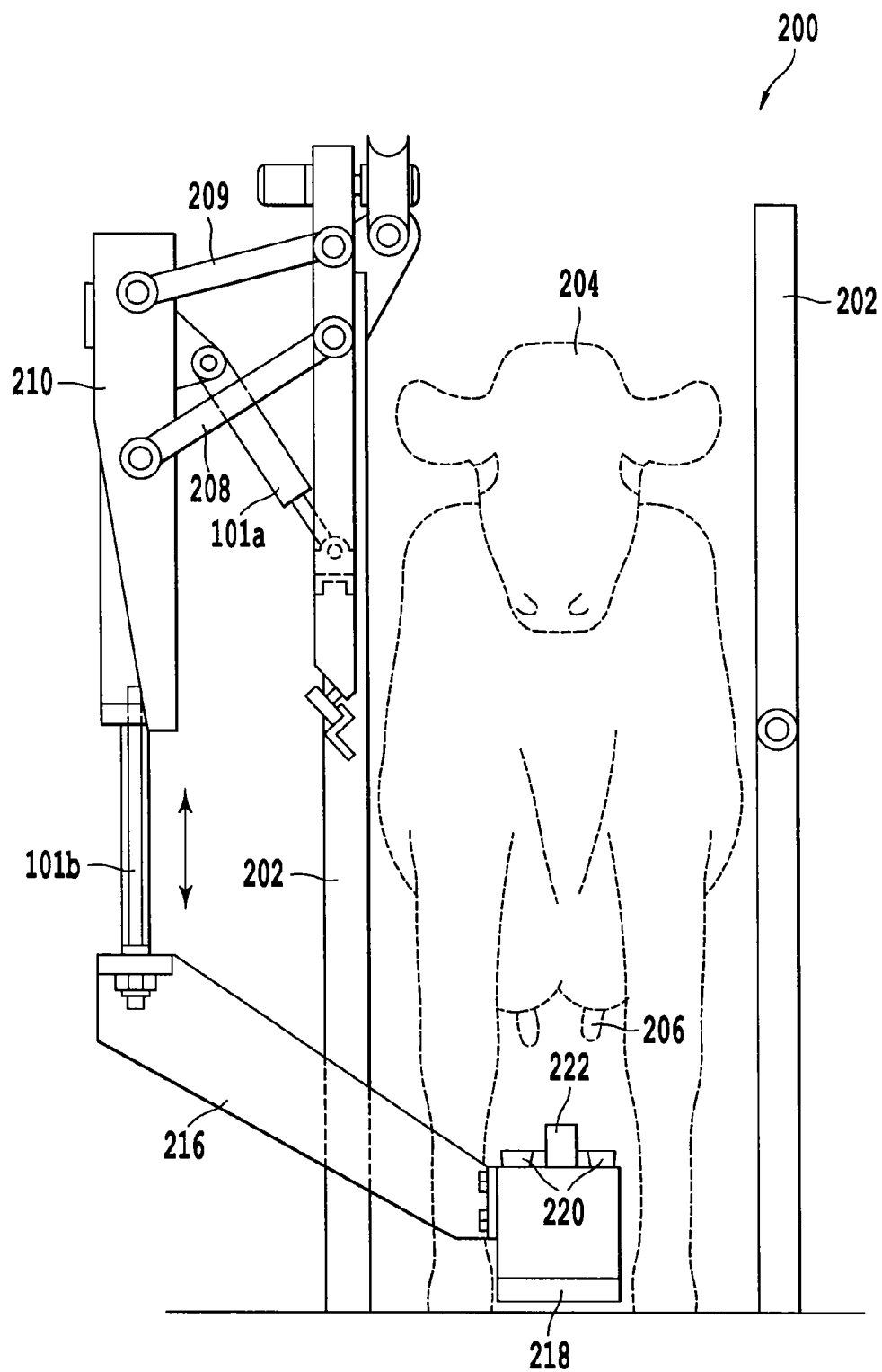
FIG. 8 illustrates diagrammatically a stand and robot arm for milking dairy animals.

The rotary platform 100 accommodates a large number of individual milking stands 103, each served by means of one robot arm. An alternative embodiment, a stand 200 can be utilized as shown in FIG. 8, with walls 202, also called a frame, between which a dairy animal 204 can be positioned for having its teats 206 milked. On one side of the wall there is provided a robot arm that is connected to the stand by means of arms 208 and 209, and that is movable with respect to the stand. The robot arm comprises a first robot arm part 210, that is movable with respect to the wall by means of a first EHA 101a, as well as a second robot arm part 216 that is movable with respect to the first robot arm part by means of a second EHA 101b. The second robot arm part is provided with a carrier 218 for carrying milking cups 220 as well as a teat detection system 222. As above, the EHAs are close to the animal, the milking equipment and thus possibly also close to the milk itself, and contamination is to be avoided.

Figure 6A:
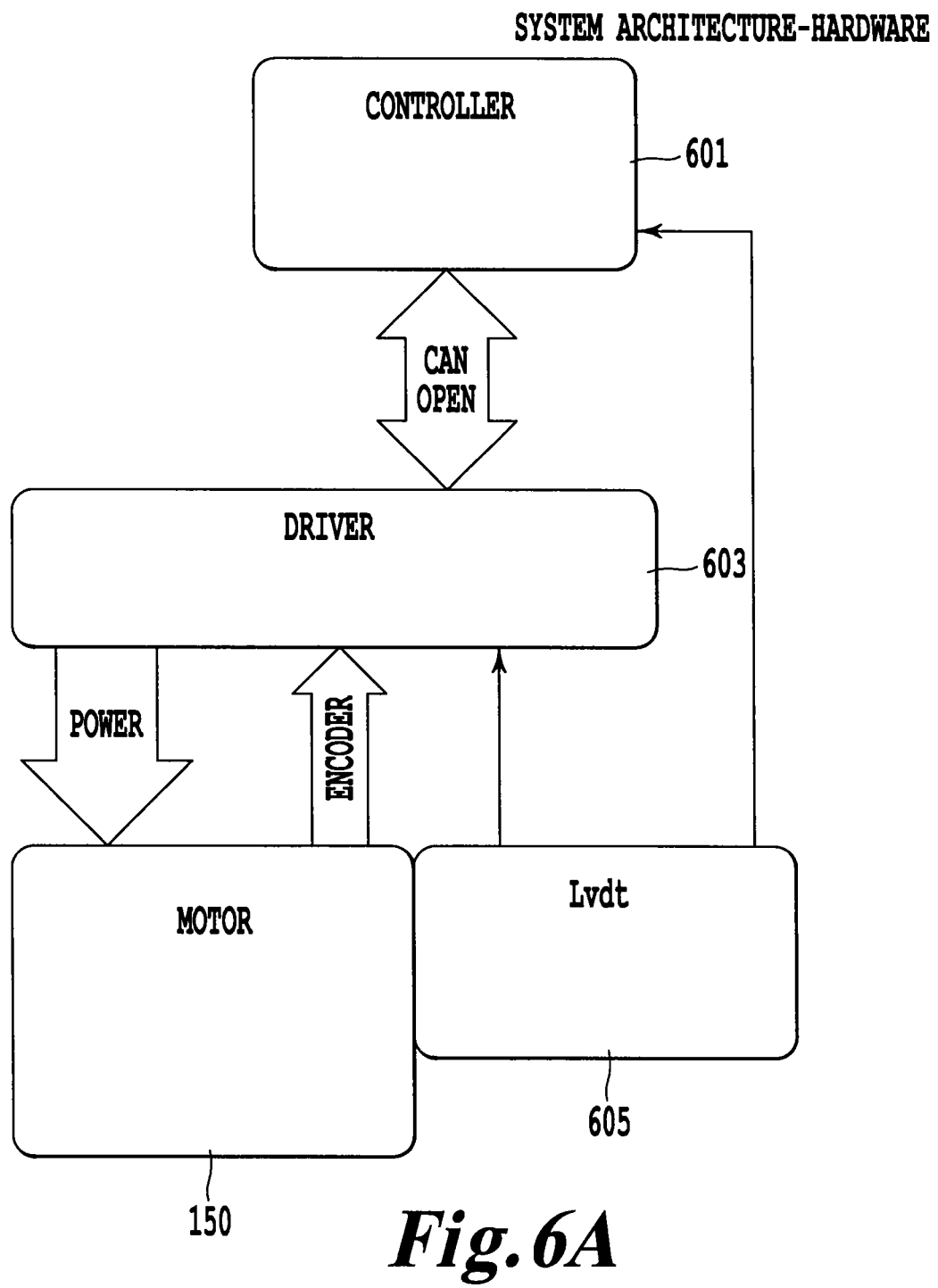
FIG. 6A illustrates a system control architecture and FIG. 6B is a flowchart illustrating a method for controlling a plurality of distributed electro-hydraulic actuators when the system is in a normal operating state.

A system architecture of the programmable controller is illustrated in FIG. 6A. A programmable controller (not the motor driver) 601 can be used to control piston movements and position. The control program is stored in the controller either in battery-backed-up RAM or some other non-volatile flash memory. Basic operations of the piston which can be controlled include movement boundaries, route tracking, shut off procedures, turn on procedures, manual control of each axis (X and Z), and a user interface. Other controls include interpolation of route movement, balk response, current limit control in both the X and Z directions resulting in floatation of the arm, adjustments of exertions and final tuning of dynamic movements, data collection for optimizations, vision adaptation, and a closed milking loop.

A driver 603 calculates direct parameters of current of the motor 150 and closes the loop of PID control. A camera or laser sends position information of a target such as a teat of a milking animal. Current limiting control of an EHA can be accomplished by learning the system loads relative to position and then applying the power needed relative to the positions along the path. For example, when using two EHAs to move a robot arm, each axis of the robot arm can be divided into nine (9) segments, for example. Consequently, there will be eighty one (81) learned areas because information can be collected regarding what power each motor of the EHA needs. That is, the force is relative to the pressure which is relative to the torque which is relative to the current in the motor. For each of the eighty one areas, two parameters of current limit to each motor can be stored. The next time the arm passes through that area, the programmable limit will deliver to the motor no more current than its need for that area. The reason to use two parameters for each motor is because the system needs to run in two direction and so will the current limit.

Similar to setting limits on the current of the motor, limits can be set for the pressure reliefs in a similar fashion. For each of the eighty one (81) areas, a parameter regulating a permissible pressure for that area can be set. By learning in advance the permissible pressures, the next time the robot arm travels through a specific area, the electro proportional valve will limit the power that the system can deliver to the arm. The electro proportional valve can be of the type provided by Sun hydraulics, for example model RBAP-MWN. An alternative control would be to use a manual pressure relief and set it to the maximum power that the system has to deliver. The result will be less flexible but more simple and inexpensive.

During a learning stage, each of the eighty one (81) segments is traveled through and a current limit for exiting each of the segments is learned. The learned current limits relate to the maximum stroke of the respective pistons for each segment.

If during a current control movement, the measured current exceeds the learned current limit (plus a predetermined tolerance), it means that that the robot art has been impacted by the milking animal or some other obstruction. In that case an obstacle avoidance program can be executed if a relief valve of an EHA is not tripped.

Position control of the piston rod 126 can be provided via a position transducer 605. The transducer providing an analogue position signal proportional to the cylinder rod position. Alternatively, sensors can be provided on the arm (i.e., an encoder sensor or tilt sensor).

Figure 6B:
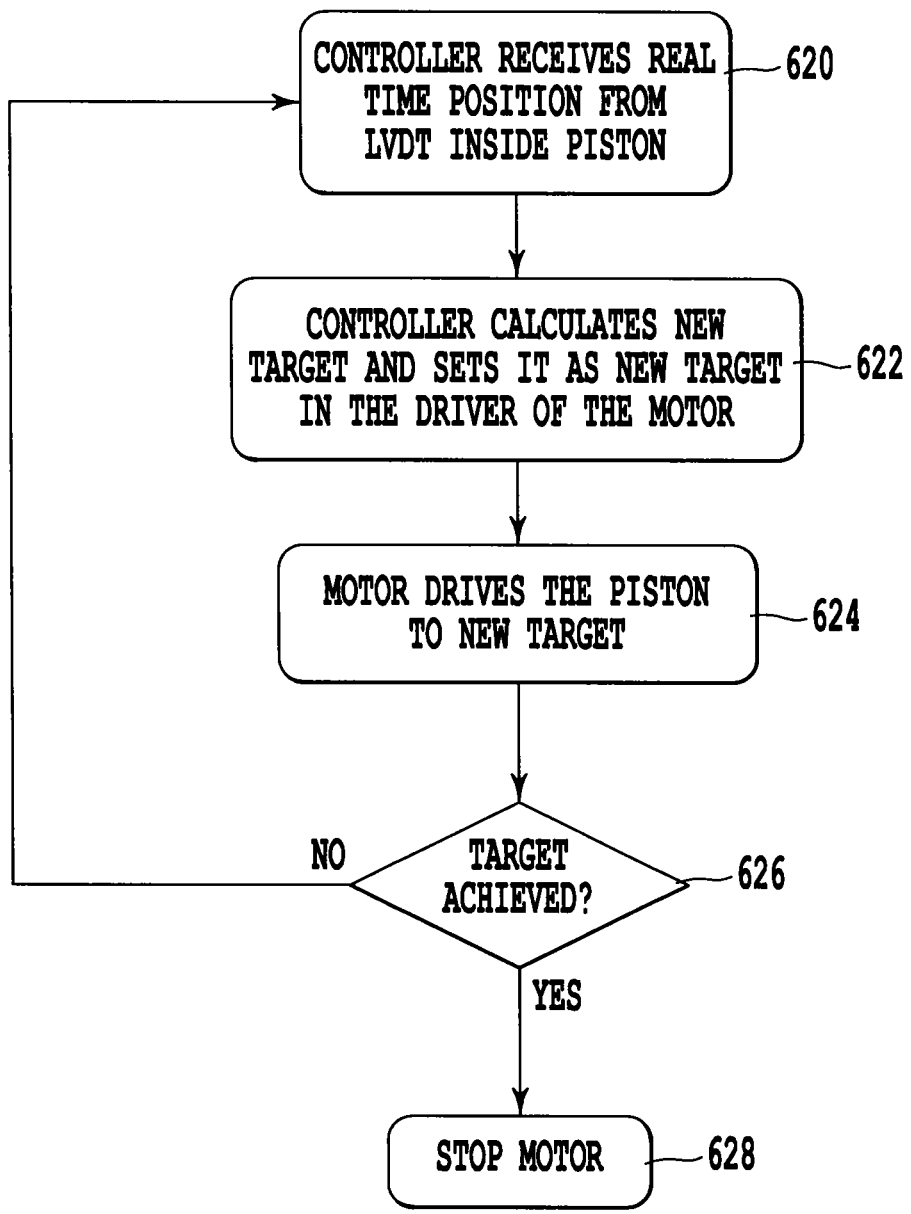

FIG. 6B is a flowchart of one manner of tracking a target. In step 620, the controller 601 receives position information of a piston of an EHA from the position transducer 605. In step 622, the controller 601 calculates a new target location and sets that new target location in the driver 603 of the motor. In step 624, the motor drives the piston of the EHA to the new target. If the target has not been achieved, then in decision 626 the controller receives updated position information of the piston. If the target has been reached, then the motor is stopped in step 628.

An advantage of using a number of, in principle, independent EHAs with independent power supplies is that, even if there is an EHA that requires a lot of power due to a high local resistance, the other EHAs are independently driven and hence will receive proportionately less power. In conventional systems, however, wherein a single centralized pump pressurizes all the hydraulical fluid, all of the actuators serviced by the centralized pump would receive a maximum pressure and power. Another advantage is that, as soon as an EHA has been displaced, the electric motor (drive) 150 can be switched off, and no further pressurizing is required, contrary to conventional systems. Then, in case a milking animal pushes a component of the robot arm, the corresponding EHA is able to yield with this external pressure providing safety for the animal.

As a consequence of the present invention, a number of parts or components of a conventional hydraulical system are no longer necessary. Those components include piping or hosing to a centralized pump, a pressure regulator, and fittings swivels. Flexible piping allows for an expanding volume under pressure, but yield less accurate moves and thus makes it difficult to achieve fine moves.

Electro-hydraulical systems using EHAs as described herein can be made very powerful, and fast, in contrast to conventional electro-mechanical actuators and, to a lesser extent, pneumatic systems. Further, the present system is considerably more leak-proof than conventional electro-mechanical actuators. The primary seals required by the present system are those where, in case of a cylinder, the rod leaves the cylinder housing. Thereby, the risk of oil spill into a teat cup or onto an animal or the surroundings is much smaller, as compared to conventional hydraulic systems having a number of connections and hydraulic hoses, due to the plurality of mutually displaceable parts. The present system ensures a safer and cleaner working environment, with fewer connections, no hoses (hydraulical connections are instead made through bores in solid parts), and almost always a lower hydraulical pressure than conventional systems. Note that, in conventional hydraulic systems, a constant high pressure is required, and thus large sprays of oil can be created if a leakage occurs. This is an important outcome to avoid where animals produce consumable products.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A robotic apparatus for treatment of at least one body part of an animal,
comprising:
   a treatment device that treats the body part,
   a detection device that detects the body part,
   a robot arm including a plurality of robot arm parts and a plurality of hydraulic actuators for mutually displacing and positioning of the robot atm parts, at least two of the plurality of hydraulic actuators being independently controlled electro-hydraulic actuators, and
   a controller configured to control the hydraulic actuators to assist the robot arm in bringing the robot arm part having the treatment device to the body part in response to feedback from the detection device,
   wherein the electro-hydraulic actuators each further comprise:
      a hydraulic circuit with fluid and a fluid volume compensation device,
      a fluid pump with a pump housing that pumps the fluid through the circuit, and
      a cylinder with a cylinder housing and a piston that is movable in the cylinder housing, is connected to a piston rod and divides the cylinder housing in a first cylinder chamber and a second cylinder chamber, and
   wherein the pump housing further comprises a first pump side with a first fluid opening and a second pump side with a second fluid opening, further comprising a rigid and unitary hydraulic connection between the first fluid opening and the first cylinder chamber as well as a rigid and unitary fluid connection between the second fluid opening and the second cylinder chamber.

2. The apparatus according to claim 1, wherein the pump housing and the cylinder housing are integrated into a single housing, internally provided with the hydraulic circuit having no outside connection, and wherein all internal passages of the hydraulic circuit, including the fluid connections, are formed by bores in the single housing.

3. The apparatus according to claim 1, comprising at least one stand in which the animal is to be treated, wherein the robot aim is provided operatively moveable with respect to the animal in the stand.

4. The apparatus according to claim 3, wherein the stand is a stationary box provided with an actuator that moves the robot arm as a whole with respect to the box, wherein the robot arm is moveable into the box, and wherein each of the actuators that move the robot arm parts and that move the robot arm as a whole is an independently controlled electro-hydraulic actuator.

5. The apparatus according to claim 3, provided with a plurality of boxes on a rotatable platform, wherein the robot aim is moveable into each of the boxes upon rotation of the platform, and wherein each of the actuators that move the robot aim parts is an independently controlled electro-hydraulic actuator.

6. The apparatus according to claim 4, further provided with at least one controllable gate in front of the box, to control access of the animal to the box, and provided with at least one independently controlled electro-hydraulic actuator.

7. The apparatus according to claim 1, wherein the animal is a milking animal, and the body part is a teat.

8. The apparatus according to claim 1, wherein each hydraulic actuator includes a relief valve, and a relief pressure of at least one of the plurality of relief valves can be individually set.

9. The apparatus according to claim 1, wherein at least one of the electrohydraulic actuators comprises a cylinder with a piston provided movable along a first line therein, the piston being connected to a piston rod that extends through the cylinder along said line and projects from the cylinder at two opposite sides of the cylinder.

10. The apparatus according to claim 1, wherein at least one of the electrohydraulic actuators comprises an integrated closed-cell sponge as an accumulator.

11. The apparatus according to claim 1, wherein the robot arm includes means for load balancing.

12. The apparatus according to claim 1, wherein the cylinder of at least one electrohydraulic actuator includes means for locking the piston in place to neutralize displacement of hydraulical fluid.

13. The apparatus according to claim 1, wherein the piston rod is a double ended piston rod.

* * * * *